US009424422B2

(12) United States Patent
Ben-Itzhak et al.

(10) Patent No.: US 9,424,422 B2
(45) Date of Patent: *Aug. 23, 2016

(54) DETECTION OF ROGUE SOFTWARE APPLICATIONS

(71) Applicant: AVG Netherlands B.V., Amsterdam (NL)

(72) Inventors: Yuval Ben-Itzhak, Prague (CZ); Kaspars Osis, Riga (LV); Mike Boz, Foster City, CA (US)

(73) Assignee: AVG Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,096

(22) Filed: May 16, 2014

(65) Prior Publication Data
US 2014/0331323 A1 Nov. 6, 2014

Related U.S. Application Data

(63) Continuation of application No. 13/182,652, filed on Jul. 14, 2011, now Pat. No. 8,732,831.

(51) Int. Cl.
G08B 23/00 (2006.01)
G06F 21/55 (2013.01)
G06F 21/56 (2013.01)
G06F 21/52 (2013.01)

(52) U.S. Cl.
CPC .......... G06F 21/55 (2013.01); G06F 21/52 (2013.01); G06F 21/564 (2013.01); G06F 21/566 (2013.01)

(58) Field of Classification Search
CPC ....... G06F 21/52; G06F 21/55; G06F 21/564; G06F 21/566
See application file for complete search history.

(56) References Cited

U.S. PATENT DOCUMENTS

| 7,287,159 | B2* | 10/2007 | Rabin | G06F 21/564 713/161 |
| 7,376,977 | B2* | 5/2008 | Jindal | G06F 21/651 726/26 |
| 7,624,446 | B1* | 11/2009 | Wilhelm | H04L 63/1416 380/255 |
| 7,913,292 | B2* | 3/2011 | Hartrell | G06F 21/554 707/687 |
| 8,037,418 | B2* | 10/2011 | Herle | H04M 1/72525 715/744 |
| 2006/0230464 | A1* | 10/2006 | Robbins | G06F 21/31 726/28 |
| 2007/0072661 | A1* | 3/2007 | Lototski | G06F 21/566 463/1 |
| 2008/0046738 | A1* | 2/2008 | Galloway | H04L 63/1483 713/176 |
| 2010/0293615 | A1* | 11/2010 | Ye | G06F 21/566 726/22 |
| 2012/0117650 | A1* | 5/2012 | Nachenberg | G06F 21/562 726/24 |

* cited by examiner

Primary Examiner — David Garcia Cervetti
Assistant Examiner — Khoi Le
(74) Attorney, Agent, or Firm — Kramer Levin Naftalis & Frankel LLP

(57) ABSTRACT

Software applications are analyzed to determine if they are legitimate applications and warnings are provided to users to avoid installation and/or purchases of unnecessary and/or potentially harmful software based on comparisons of user-interface characteristics of the software applications to visual characteristics of authentic applications to determine to what extent they match (or do not match) or are attempting to mirror the legitimate application.

15 Claims, 3 Drawing Sheets

DETECTION OF ROGUE SOFTWARE APPLICATIONS

CROSS-REFERENCE TO RELATED APPLICATIONS

This application is a continuation of U.S. patent application Ser. No. 13/182,652, which is fully incorporated by reference herein in its entirety.

FIELD OF THE INVENTION

The invention relates generally to computer security, and, more specifically, the identification of rogue software applications that deceive users into purchasing the rogue software.

BACKGROUND

The advance of computer and networking technologies has resulted in a significant increase in the number of people who use computers in their daily lives to conduct business, communicate with friends and co-workers, and store information. In performing these functions, users are often required to provide personally-identifiable and/or sensitive private information such as user names, passwords, account numbers, birth dates, social security numbers and credit card numbers. Because this information can be used for nefarious purposes, such as stealing identities, executing fraudulent purchases and other similar schemes, an entire class of software has evolved with the sole purpose of covertly gathering and transmitting this information to third parties. Such software, often referred to as "malware" or "spoof" software, comes in many forms and is designed to infiltrate a computer system such that its detection and removal is very difficult, especially for the casual computer user.

In response to these threats, legitimate computer software companies have introduced so-called "Anti-Virus" software, which is designed to identify and remove malware, spyware, and other potentially threatening applications. In some instances, the anti-virus software operates as an ongoing process and when new software is introduced onto the machine, the anti-virus software performs a pre-installation scan or file check to deters determine if the software is legitimate even before it is installed on the computer. These applications often present the user with a screen or other visual message that indicates a virus or other malware was found or is attempting to install itself on the users machine, and instruct the user to take action. For example, the user may decide the application is legitimate and allow the installation, she may ask that the application be quarantined, or have the software removed.

With the onslaught of damaging viruses and computer-based identity threats, anti-virus software has become a very large industry and users routinely purchase new applications. Sonic developers, however, have taken advantage of this vulnerability and now present such "warning" screens even without any evidence of malware or viruses on a computer, knowing that a large percentage of users will accept the installation of such software as a precaution. These applications often require users to purchase unneeded applications, and, in some cases, install malware or spyware of their own.

These applications, ret red to herein as "rogue" software, essentially prey on the fears and concerns of consumers by focusing on a market with high demand (e.g., anti-virus, password management, browser plug-ins, etc.) but offer sub-standard products. To increase their appeal, developers of rogue software design their applications with a look and feel similar to that of reputable software; applications, further confusing users. Recently, consumers have begun identifying these rouge programs and are demanding that legitimate anti-virus and malware detection applications trap these applications as well. What is needed, therefore, is a method and system for positively identifying rogue software applications that are designed to appear as legitimate applications, but in fact are not.

SUMMARY OF THE INVENTION

In various embodiments of the present invention, software applications are anal to determine if they are legitimate applications and warnings are provided to users to avoid installation and/or purchases of unnecessary and/or potentially harmful software. This is achieved, in part, by comparing certain characteristics of potentially "rogue" software to the same or similar characteristics of known, legitimate applications. In addition to using binary signature detection methods and behavioral functions, user interface characteristics are used to determine if an application is legitimate. These visual characteristics can be compared to visual characteristics of other applications to determine to what extent they match (or no not match) or are attempting to mirror the legitimate application.

As used herein, "rogue" software generally means a software product that substantially mimics the look and feel of another legitimate software product, but not its functionality. Generally, the rough software masquerades as a legitimate product, often as an anti-virus or computer-maintenance/performance-enhancement software, and convinces a user to buy the fake product. Thus in some ways, the rogue software is analogous to a phishing website that presents itself as an authentic website to a user. The conventional anti-virus and/or malware-detection applications may not adequately protect a user from a rogue software because it typically does not perform any harmful actions on a computer (e.g., deleting files, accessing passwords, etc.), and hence, may not be detected by the conventional applications.

In order to facilitate detection of rogue software products, features of the user-interface (UI) of an offered software are analyzed. Some exemplary UI features include the window title name, names of menu buttons, types of components in the UI (e.g. progress bar, lists, buttons, etc.), image files associated with the offered software, dialogue names, and colors. From the downloaded executable and/or data files associated with an offered software product, the various features are extracted. These features are compared with the known features of legitimate products, and a potentially rogue software is detected if the extracted features and the known features are similar but do not match exactly or nearly exactly. In some instances, components of the downloaded executable and/or data files such as digital signatures, etc. are also inspected to determine whether the offered software product is a rogue product.

Accordingly, in one aspect, a method for determining the legitimacy of a software application being presented to a user of a computing device includes programmatically detecting the execution of a software application on a computing device, during which user interface characteristics of the software application are collected and stored in a memory. For example, one method to collect such user interface characteristics on systems using the Microsoft Windows Operating System (OS) is to utilize one or more of the OS Application Programming Interfaces (APIs) provided with the OS. The collected user interface characteristics are compared to known user interface characteristics of legitimate software applications and if a similarity between the collected user interface characteristics and the known user interface characteristics surpasses a predefined similarity threshold, analyzing additional characteristics of the executing software application to determine whether the application is a legitimate software application.

The computing device can be a personal computer, a tablet computer, a game console, or a mobile communications device. The user interface characteristics may he one or more of window title names, screen control names, screen control components, progress bars, lists, buttons, image files, dialog box names, colors, and system tray settings. The legitimate software applications comprise anti-virus applications, and the executing software application may be a rogue software application masquerading as an anti-virus application. The additional characteristics may include a digital signature, a source location, a binary signature of the executing software application, an operating system device driver, and/or an operating system kernel driver.

In some embodiments, a determination is made as to whether the executing software has been digitally signed, and, if not, the executing software is classified as rogue software. The source location from which the executing software was transmitted to the computing device may also be determined and if not known to be an authentic source of legitimate software applications, the executing software is classified as rogue software. Further, a binary signature of the executing software may be calculated or determined, and if it does not match a binary signature of a known legitimate software application, the executing software is classified as rogue software. In each case, the user may then be presented with a message indicating the software is rogue.

In certain implementations, execution of the software is forced to terminated and the files associated with the application are quarantined for subsequent deletion from the computing device. Again, the user may be presented with a message suggesting and/or confirming the deletion of the software application from the device.

In another aspect, a system for analyzing determining the legitimacy of a software application being presented to a user of a computing device includes computer-executable instructions stored on a memory device. When executed by a processor, the instructions programmatically detect the execution of a software application on a computing device during which interface characteristics of the software application are collected and stored in a memory. The instructions further cause known user interface characteristics of legitimate software applications to be retrieved from a database, and programmatically compare the collected user interface characteristics to the known user interface characteristics. If a similarity between the collected user interface characteristics and the known user interface characteristics surpasses a predefined similarity threshold, the instructions analyze additional characteristics of the executing software application to determine whether the application is a legitimate software application.

In some implementations, the instructions further determine if the executing software has been digitally signed, if the source location from which the executing software was transmitted to the computing device is an authentic source of known legitimate software applications, and/or if the binary signature of the executing application matches a binary signature of a known legitimate software application and, if one or more of these conditions are not met, the executing software is classified as rogue software. In some instances the user is presented with a message indicating the software is rogue software. In some instances, the instructions force termination of the executing software application and quarantine the files associated with the executing software application for subsequent deletion from the computing device. The software may also be deleted from the computing device, and appropriate messages presented to the user.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
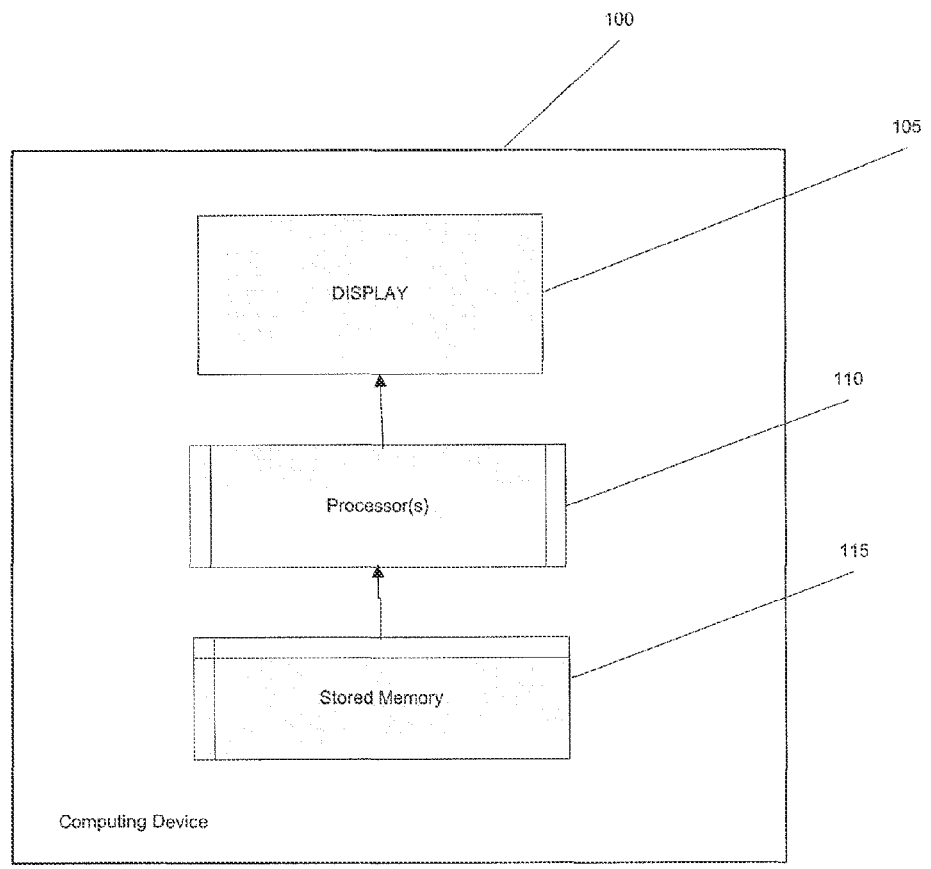
FIG. 1 schematically depicts an exemplary computing device and system components for performing the methods described herein according to one embodiment of the invention.

Referring to FIG. 1, a computing device 100 on which various embodiments of the invention may be implemented includes a stored memory 105, one or more processors 110 and a display 315. In some embodiments, the device may include other components such as user input mechanisms such as a keyboard, mouse, pointer and the like. In other cases (or in combination with these input mechanisms) the display 115 may also provide user input functionality using, for example, touch screen technology as known in the art. Although FIG. 1 shows a single device 100, this are illustrative only and is meant to include devices such as cell phones, smart phones, netbooks, wireless devices, gaming consoles, pad computers and/or personal digital assistants (PDAs). The device 100 is typically connected to a communication network (e.g., a private network, a local-area network, a wireless network, the Internet, etc.) in order to send and receive messages and data from other devices.

The stored memory 105 stores applications and data that are used by the device to perform functions as directed by the user of the device. One such application that is routinely installed and used on the device is anti-virus software, which assists the user in identifying and eliminating unwanted software, and/or restoring systems settings to proper values. Examples of unwanted software include, for example, malware, keyboard loggers, tracking cookies, viruses, and the like, which are typically installed on the device 100 without the users knowledge or consent. Because the unwanted software can have such a detrimental impact on the users device and/or compromise the user's privacy and security, users are especially prone to purchasing anti-virus software when they are informed of a potential infection.

Unscrupulous software vendors are aware of this vulnerability and have devised schemes to take advantage of users' naïveté in this regard. For example, software vendors have designed applications that mimic the look, feel and operation of legitimate anti-virus applications that, when executing, lure the users into a false sense of threat and, based on this fear, encourage the user to purchase the software unnecessarily. Unlike traditional malware and viruses, these applications do not perform any "harmful" functions (e.g., deleting files, changing registry entries, creating tracking cookies, or covertly transmitting data). As such, the execution of these applications is not detected by conventional anti-virus software applications. Using the techniques and systems described herein, however, users can be notified when these rogue applications are presented to them and can be informed that the applications are not authentic anti-virus applications.

Figure 2:
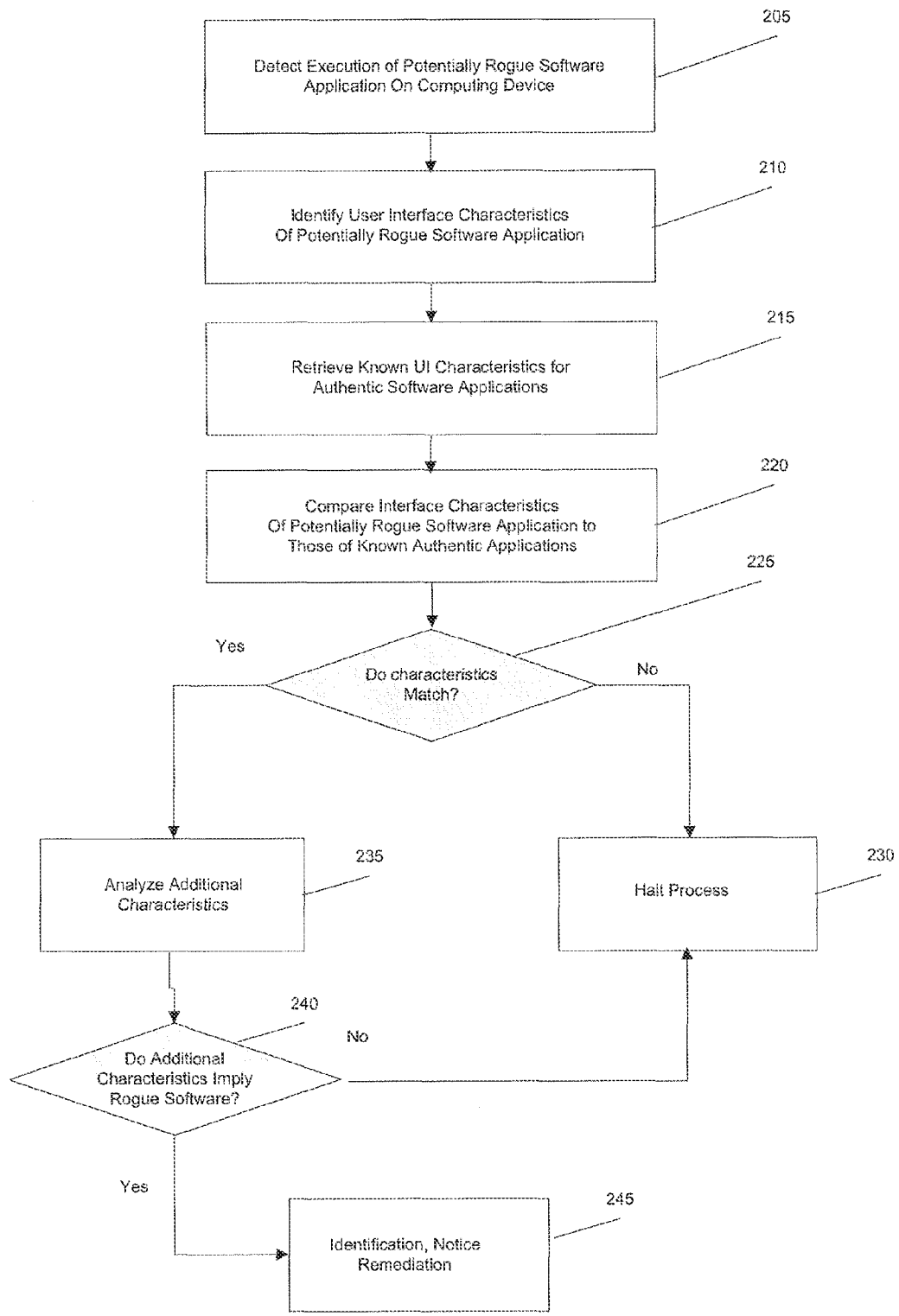
FIG. 2 shows a flow diagram of the steps performed in identifying and remediating potentially rogue software when presented to a user of a computing device according to one embodiment of the invention.

According to various embodiments of the invention, and referring to FIG. 2, a user operating a computing device may be presented with a warning screen, pop-up ad, email or other message (generally referred to herein as a "potentially rogue software application" or "application") that indicates (usually falsely) that their device is under threat from malware, a virus, or other potentially damaging software. The execution of this "application" is first detected on the device (STEP 205). The detection may take place by monitoring the Windows messaging queue for new display commands containing certain elements. Once detected, various user interface characteristics are then identified and collected (STEP 210). These characteristics may include, for example, window title names, screen control names, screen control components, progress bars, lists, buttons, image files, dialog box names, colors, text, and/or system tray settings. The specific characteristics may be stored in memory for subsequent comparison.

Separately, a database of visual characteristics of known authentic anti-virus software applications may be maintained. In some instances, the database may be a centrally-managed database (e.g., by an anti-virus application vendor, for example) and accessed remotely over the Internet, or, in some cases, the database may be stored locally on the device itself. If stored locally, the local database may be updated periodically (e.g., every week, month, etc.), on demand, or whenever the central database is updated. In any instance, user interface characteristics from the authentic anti-virus applications are retrieved from the database (STEP 215) and compared to those collected from the executing application (STEP 220). The comparison may include comparing object names, naming conventions, text, binary representations of images, as well as other comparisons to determine a degree of match between the application being analyzed and applications known to be authentic. If none of the characteristics match, or so few match that it is unlikely that the application not being passed off as anti-virus software (DECISION STEP 225), the process ends (STEP 230). If, however, the degree of match is above some predetermined threshold (e.g., more than 75% of the components in a known anti-virus application exist in the potentially rogue software) additional characteristics are then analyzed (STEP 235).

For example, if the application is now suspected as being rogue software, characteristics such as the binary signature of the executing application may be captured and compared to those of applications known to be authentic applications. In some cases, the comparison may be limited to those applications to which a high degree of match among the user interface characteristics was made. In other instances, the application may be analyzed to determine if it has a digital signature associated with it, as most rogue applications do not. Further, in some implementations it is feasible to determine the source from which the application was sent to the device, and that source (e.g., a URL, IP address, email address, or other uniquely identifiable information) may be captured and compared to those of authentic applications. If these characteristics do not match those of applications known to be authentic (DECISION STEP 240) the applications are then classified as rogue applications.

Once classified as such, the users may be notified and remediation may then take place (STEP 245). For example, the user may be presented with a dialog box informing him that the application screen being presented is from a rogue application, and that there are in fact no known threats to his device, and any suggestions to execute or purchase the application should be ignored. In some versions, the process may continue by searching for and removing any components of the rogue application present on the device. In still other versions, a digital signature, hash, or other numeric representation of the application or its components may be derived and stored and/or transmitted to a central repository for tracking such applications.

Figure 3:
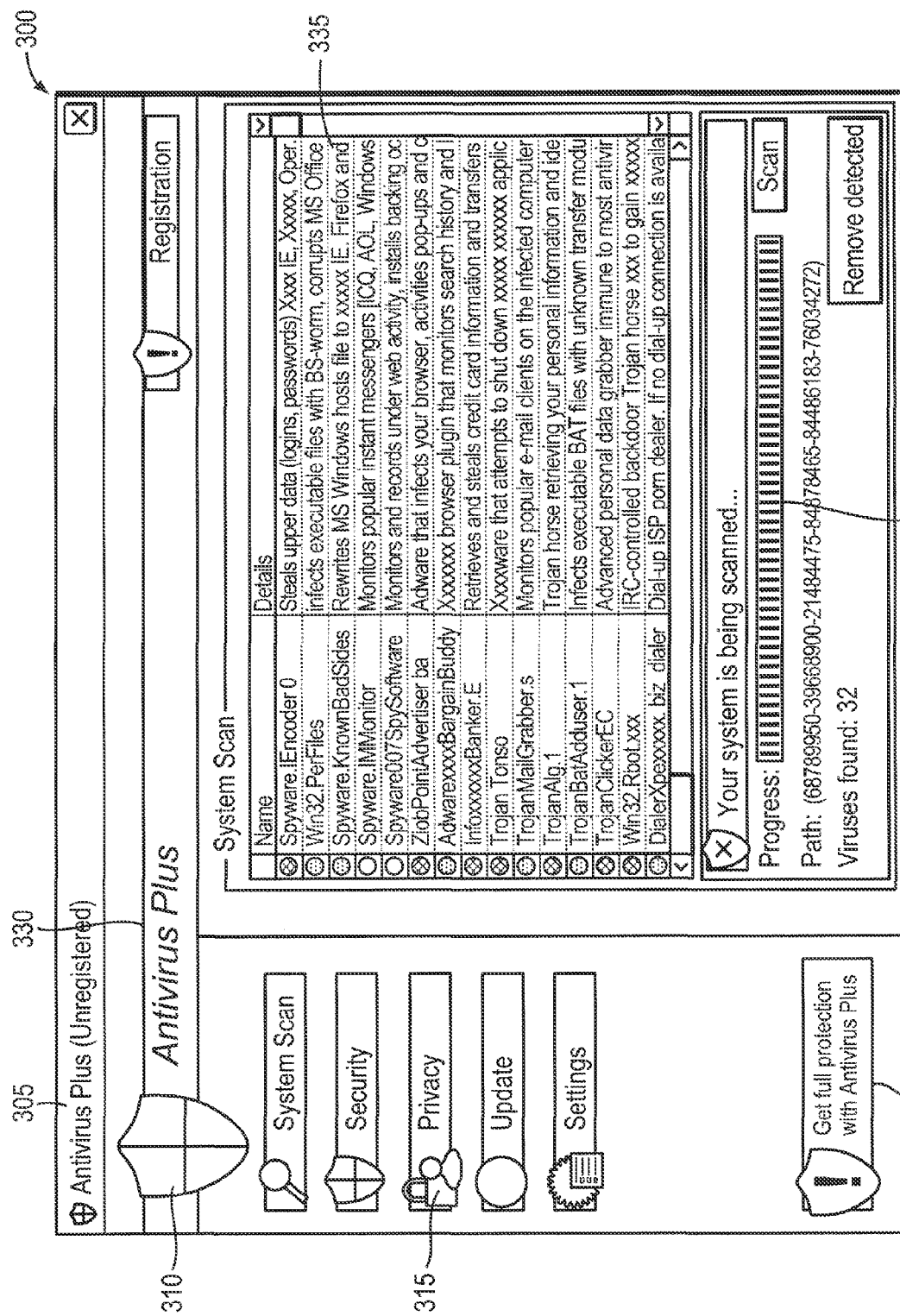
FIG. 3 shows an exemplary screen image of a software application that may be analyzed using the methods and systems described herein.

FIG. 3 provides an exemplary screen capture 300 from an application determined to be rogue software using the above-described techniques. The user interface components that make up the screen 300 that may be compared to those of authentic anti-virus applications include the window name, "Antivirus Plus (Unregistered)" 305, an image (typically a .jpg file) of shield 310 that is very similar to an image used in an authentic application and buttons 315 having text descriptions such as "privacy," "security," "scan" and the like. Other components include a progress bar 320 indicating the status of a scan, text suggesting the user "get full protection" 325 or "purchase the application now," a color and menu scheme that matches known application schemes 330 and/or a listing of system scan results 335.

Each functional component described above may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A computer-implemented method for determining the legitimacy of a software application, the method comprising:
   programmatically detecting, using a processor of a computing device, that the software application is resident on the computing device;
   extracting, using the processor, visual user interface characteristics from at least one of an executable file and a data file associated with the software application;
   collecting and storing, using the processor, the visual user interface characteristics of the software application in a memory of the computing device;
   programmatically comparing, using the processor, the collected visual user interface characteristics to known visual user interface characteristics of at least one known legitimate software application;

when a similarity between the collected visual user interface characteristics and the known visual user interface characteristics surpasses a predefined similarity threshold, analyzing at least one additional characteristic of the software application, wherein the at least one additional characteristic comprises at least one of a device driver and a kernel driver; and terminating the software application and quarantining the files associated with the software application for subsequent deletion from the computing device when the at least one additional characteristic is indicative of rogue software.

2. The computer-implemented method of claim 1, wherein the extracting comprises:

extracting at least one of window title names, screen control names, screen control components, progress bars, lists, buttons, image files, dialog box names, colors, and system tray settings.

3. The computer-implemented method of claim 1, further comprising:

determining if the software application has been digitally signed, and, if not:

classifying the software application as rogue software; and presenting a user with a message indicating that the software application is rogue software using a display of the computing device.

4. The computer-implemented method of claim 1, further comprising:

determining a binary signature of the software application and determining if the binary signature matches a known binary signature of a known legitimate software application and, if not:

classifying the software application as rogue software; and presenting a user with a message indicating that the software application is rogue software using a display of the computing device.

5. The computer-implemented method of claim 1, further comprising:

determining if the source of the software application is a source of known legitimate software applications and, if not;

classifying the software application as rogue software; and presenting a user with a message indicating that the software application is rogue software using a display of the computing device.

6. The computer-implemented method of claim 1, wherein the legitimate software application comprises an anti-virus application.

7. The computer-implemented method of claim 6, wherein the software application is a rogue software application masquerading as an authentic anti-virus application.

8. The computer-implemented method of claim 1, further comprising:

presenting a user with a message recommending deletion of the software application on a display of the computing device.

9. The computer-implemented method of claim 1, wherein the extracting is performed while the software application is not executing on the computing device.

10. A system for determining the legitimacy of a software application provided to a user of a computing device, the system comprising:

an Application Programing Interface ("API") configured to:

detect that the software application is resident on the computing device; and collect and store visual user interface characteristics of the software application;

at least one memory component storing at least (i) the software application and (ii) computer executable instructions comprising a plurality of modules for determining the legitimacy of the software application, the plurality of modules comprising:

a feature extraction module configured to extract visual user interface characteristics from at least one of an executable file and data files associated with the software application;

an analysis module configured to:

compare the collected visual user interface characteristics to the known visual user interface characteristics of at least one known legitimate software application; and when a similarity between the collected visual user interface characteristics and the known visual user interface characteristics surpasses a predefined similarity threshold, analyze at least one additional characteristic of the software application, wherein the at least one additional characteristic comprises at least one of a device driver and a kernel driver; and a remediation module configured to terminate the software application and quarantine the files associated with the software application for subsequent deletion from the computing device when the at least one additional characteristic is indicative of rogue software; and at least one processor configured to execute the plurality of modules.

11. The system of claim 10, comprising a database communicatively coupled to the computing device and storing the known visual user interface characteristics of the at least one known legitimate software application.

12. The system of claim 10, wherein the computing device comprises one of a personal computer, a tablet computer, a game console, and a mobile communications device.

13. The system of claim 10, wherein the analysis module is further configured to:

determine if the software application has been digitally signed; and if the software application does has not been digitally signed, classify the software application as rogue software.

14. The system of claim 10, wherein the analysis module is further configured to:

determine the binary signature of the software application;

determine if the binary signature matches a known binary signature of a known legitimate software application; and if the binary signature of the software application does not match a known binary signature of a known legitimate software application, classify the software application as rogue software.

15. The system of claim 10, comprising a display device that displays a message indicating that the software application is rogue software when the at least one additional characteristic is indicative of rogue software.

* * * * *